United States Patent
Nguyen

(10) Patent No.: US 8,711,798 B2
(45) Date of Patent: *Apr. 29, 2014

(54) PROVISION OF DOWNLINK PACKET ACCESS SERVICES TO USER EQUIPMENT IN SPREAD SPECTRUM COMMUNICATION NETWORK

(75) Inventor: Phong Nguyen, Victoria (AU)

(73) Assignee: NEC Corporation, Tokyo (JP)

( * ) Notice: Subject to any disclaimer, the term of this patent is extended or adjusted under 35 U.S.C. 154(b) by 93 days.

This patent is subject to a terminal disclaimer.

(21) Appl. No.: 13/551,802

(22) Filed: Jul. 18, 2012

(65) Prior Publication Data

US 2012/0314669 A1  Dec. 13, 2012

Related U.S. Application Data

(63) Continuation of application No. 12/064,796, filed as application No. PCT/JP2006/317148 on Aug. 24, 2006, now Pat. No. 8,335,183.

(30) Foreign Application Priority Data

Aug. 26, 2005  (AU) ................. 2005904679

(51) Int. Cl.
*H04W 4/00* (2009.01)
*H04W 4/06* (2009.01)
*H04L 12/18* (2006.01)
*H04W 72/00* (2009.01)

(52) U.S. Cl.
CPC ............. *H04W 4/06* (2013.01); *H04L 12/189* (2013.01); *H04W 72/005* (2013.01); *H04L 12/18* (2013.01)
USPC .......... 370/329; 370/312; 370/480; 455/3.01; 455/410

(58) Field of Classification Search
None
See application file for complete search history.

(56) References Cited

U.S. PATENT DOCUMENTS

| 7,493,117 B2 | 2/2009 | Cai et al. |
| 2003/0073409 A1 | 4/2003 | Nobukiyo et al. |
| 2003/0078050 A1 | 4/2003 | Carlborg et al. |

(Continued)

FOREIGN PATENT DOCUMENTS

| EP | 1478203 A2 | 11/2004 |
| GB | 2378101 A | 1/2003 |
| JP | 10-290172 A | 10/1998 |
| JP | 2001-197021 | 7/2001 |
| JP | 2001-509346 A | 7/2001 |
| JP | 2004-23668 | 3/2004 |
| WO | WO-2004/100590 A1 | 11/2004 |

OTHER PUBLICATIONS

Japanese Office Action issued in counterpart Japanese Patent Application 2012-053368, issue date May 7, 2013 (with English translation thereof).

(Continued)

*Primary Examiner* — Ian N Moore
*Assistant Examiner* — Brian T Le
(74) *Attorney, Agent, or Firm* — Dickstein Shapiro LLP

(57) ABSTRACT

A method of providing a packetized data transmission service to a mobile terminal (108) in a spread spectrum communication network (100), includes: at a transmitter (102), broadcasting an indication message to a cell on a downlink broadcast channel (114), the indication message providing notification of an available packetized data transmission service intended for the mobile terminal (108); at the mobile terminal (108), monitoring the broadcast channel (114) for the indication message, and upon receipt, acknowledging detection of the indication message to the transmitter (102) on an uplink contention channel (116); and at the transmitter (102), upon contention completion, transmitting packetized data transmission service configuration information to the mobile terminal (108) on the broadcast channel (114).

5 Claims, 3 Drawing Sheets

(56) References Cited

U.S. PATENT DOCUMENTS

| | | |
|---|---|---|
| 2003/0119452 A1 | 6/2003 | Kim et al. |
| 2004/0087320 A1 | 5/2004 | Kim et al. |
| 2004/0137946 A1 | 7/2004 | Kawabata |
| 2004/0142706 A1 | 7/2004 | Kim et al. |
| 2004/0151133 A1 | 8/2004 | Yi et al. |
| 2004/0203336 A1 | 10/2004 | Sinnarajah et al. |
| 2004/0213214 A1 | 10/2004 | Jung et al. |
| 2005/0007971 A1 | 1/2005 | Jeong et al. |
| 2005/0037767 A1 | 2/2005 | Kim et al. |
| 2005/0059437 A1 | 3/2005 | Son et al. |
| 2005/0147127 A1 | 7/2005 | Putcha et al. |
| 2005/0159135 A1 | 7/2005 | Kim |
| 2006/0067353 A1 | 3/2006 | Pekonen et al. |
| 2006/0166653 A1 | 7/2006 | Xu et al. |

OTHER PUBLICATIONS

3GPP TS 23.246 V6.7.0 (Jun. 2005) *Technical Specification*; 3rd Generation Partnership Project; Technical Specification Group Services and System Aspects; Multimedia Broadcast/Multicast Service (MBMS); Architecture and functional description (Release 6), pp. 1-47.

3GPP TS 25.346 V6.5.0 (Jun. 2005) *Technical Specification*; 3rd Generation Partnership Project; Technical Specification Group Radio Access Network; Introduction of the Multimedia Broadcast Multicast Service (MBMS) in the Radio Access Network (RAN); Stage 2 (Release 6); pp. 1-60.

PROVISION OF DOWNLINK PACKET ACCESS SERVICES TO USER EQUIPMENT IN SPREAD SPECTRUM COMMUNICATION NETWORK

CROSS REFERENCE

This application is a Continuation of U.S. patent application Ser. No. 12/064,796, filed Feb. 25, 2008, which is a national phase application under 35 U.S.C. §371 of International Patent Corporation Treaty Application No. PCT/JP06/317148, filed Aug. 24, 2006, which claims priority to Australian Patent Application No. 2005904679, filed Aug. 26, 2005. The contents of each of these referenced applications is incorporated herein by reference.

FIELD OF THE INVENTION

The present invention relates generally to the provision of downlink packet access services to a mobile station in a spread spectrum communication network. The invention is suitable for use in the provision of such services to a user equipment in a communication network conforming to the 3GPP-LTE standards being developed by the 3rd Generation Partnership Project (3GPP), and it will be convenient to describe the invention in relation to this exemplary, but non-limiting, application.

Recent enhancements in packet transmissions such as High Speed Downlink Packet Access (HSDPA) and enhanced uplink technology have made 3GPP radio-access technology highly competitive. In order to ensure that the competitiveness of this technology continues over a long time frame, a long term evolution of 3GPP radio-access technology is being developed. This new technology is known as Super 3G.

Important parts of the long term evolution of Super 3G technology will include Radio Access Network (RAN) latency reduction, higher user data rates, improving system capability and coverage, and reducing cost to a network operator. In order to achieve this, an evolution of the radio interface as well as the radio network architecture is being considered. The objective of this evolution is to develop a framework to enable high data rate, low-latency and packet-optimized radio-access.

Development of the Super 3G system has been focused on supporting services provided by the PS-domain, such as enhanced HSDPA, Multimedia Broadcast Multicast Services (MBMS), High Speed Uplink Packet Access (HSUPA) and other similar types of packet-switched services including Voice Over IP.

Existing HSDPA services in Wideband Code Division Multiple Access (WCDMA) systems are currently provided in a manner that is dependent on other dedicated RAN services. This results in an extremely complicated protocol stack design, and hinders the development of HSDPA services in WCDMA.

The Super 3G system will be developed to support enhanced HSDPA and other types of packet-switched services. However, reusing the existing HSDPA-related procedures that have been developed for the WCDMA system will lead to a situation where the future 3G system shall be coupled with and operationally dependent on existing WCDMA technology. This interdependence is likely to result in an even more complicated RAN architecture, which will then increase the cost of design, manufacture and operation of the Super 3G system.

There therefore exists a need to enable enhanced HSDPA services to be introduced into the future Super 3G system in such a manner as to be able to operate independently from the existing 3G-WCDMA system when considered from the RAN perspective. There also exists a need to provide enhanced HSDPA services in a manner that ameliorates or overcomes HSDPA service provision techniques.

SUMMARY OF THE INVENTION

In one aspect of the present invention, there is provided a method of providing a packetized data transmission service to a mobile terminal in a spread spectrum communication network, the method including at a base station, broadcasting an indication message to a cell on a downlink broadcast channel, the indication message providing notification of an available packetized data transmission service intended for the mobile terminal, at the mobile terminal, monitoring the broadcast channel for the indication message, and upon receipt, acknowledging detection of the indication message to the base station on an uplink contention channel, and at the base station, upon contention completion, transmitting packetized data transmission service configuration information to the mobile terminal on the broadcast channel.

The method may further include the steps of periodically placing the mobile terminal in an active state to monitor the broadcast channel for the indication message, and placing the mobile terminal in an inactive state, if no indication message is detected.

The method may further include the step of at the base station, transmitting control information for the packetized data transmission service to the mobile terminal on a downlink shared control channel.

The method may further include the step of at the base station, transmitting data for the packetized data transmission service to the mobile terminal on a downlink shared data channel.

The method may further include the step of at the mobile terminal, transmitting channel quality measurement and reporting information to the base station on an uplink shared scheduled channel.

The method may further include the steps of ceasing transmission from the base station of packetized data transmission control information to the mobile terminal, and upon failure to detect the packetized data transmission control information at the mobile terminal within a predetermined time, terminating the packetized data transmission service.

The method may further include the steps of at the base station, notifying the mobile terminal to terminate the packetized data transmission service by inclusion of a termination message in a packet header of an packetized data transmission control information packet, and upon detection of the termination message at the mobile terminal, terminating the packetized data transmission service.

For instance, the mobile terminal is comprised of a mobile phone.

In another aspect of the present invention, there is provided a method of controlling an operation of a base station for providing a packetized data transmission service to a mobile terminal in a spread spectrum communication network, the method including broadcasting an indication message to a cell on a downlink broadcast channel, the indication message providing notification of an available packetized data transmission service intended for the mobile terminal, the mobile terminal monitoring the broadcast channel for the indication message, and upon receipt, acknowledging detection of the indication message to the base station on an uplink contention channel, and upon contention completion, transmitting packetized data transmission service configuration information to the mobile terminal on the broadcast channel.

The method may further include the step of transmitting control information for the packetized data transmission service to the mobile terminal on a downlink shared control channel.

The method may further include the step of transmitting data for the packetized data transmission service to the mobile terminal on a downlink shared data channel.

The method may further include the steps of ceasing transmission of packetized data transmission control information to the mobile terminal, and upon failure to detect the packetized data transmission control information at the mobile terminal within a predetermined time, terminating the packetized data transmission service.

The method may further include the steps of notifying the mobile terminal to terminate the packetized data transmission service by inclusion of a termination message in a packet header of an packetized data transmission control information packet, and upon detection of the termination message at the mobile terminal, terminating the packetized data transmission service.

In still another aspect of the present invention, there is provided a program for causing a computer equipped in a base station to carry out the above-mentioned method.

In yet another aspect of the present invention, there is provided a system for providing a packetized data transmission service in a spread spectrum communication network, the system including a base station and a mobile terminal, the base station being adapted to broadcast an indication message to a cell on a downlink broadcast channel, the indication message providing notification of an available packetized data transmission service intended for the mobile terminal, the mobile terminal being adapted to monitor the broadcast channel for the indication message, and upon receipt, acknowledging detection of the indication message to the base station on an uplink contention channel, and the base station being further adapted, upon contention completion, to transmit packetized data transmission service configuration information to the mobile terminal on the broadcast channel.

In the above-mentioned system, the mobile terminal may be comprised of a mobile phone.

In still yet another aspect of the present invention, there is provided a base station in a system for providing a packetized data transmission service in a spread spectrum communication network, the system including the base station and a mobile terminal, the base station being adapted to broadcast an indication message to a cell on a downlink broadcast channel, the indication message providing notification of an available packetized data transmission service intended for the mobile terminal, the mobile terminal being adapted to monitor the broadcast channel for the indication message, and upon receipt, acknowledging detection of the indication message to the base station on an uplink contention channel, and the base station being further adapted, upon contention completion, to transmit packetized data transmission service configuration information to the mobile terminal on the broadcast channel.

The present invention will now be described in reference to the attached drawings in which a method and system of providing a High Speed Downlink Packet Access (HSDPA) service is illustrated as a preferred embodiment. It is to be appreciated that the invention is not to be construed as being limited to the particular embodiment illustrated in the drawings.

DESCRIPTION OF THE EXEMPLARY EMBODIMENTS EMBODIMENTS

Preferred embodiments in accordance with the present invention will be explained hereinbelow with reference to drawings.

Figure 1:
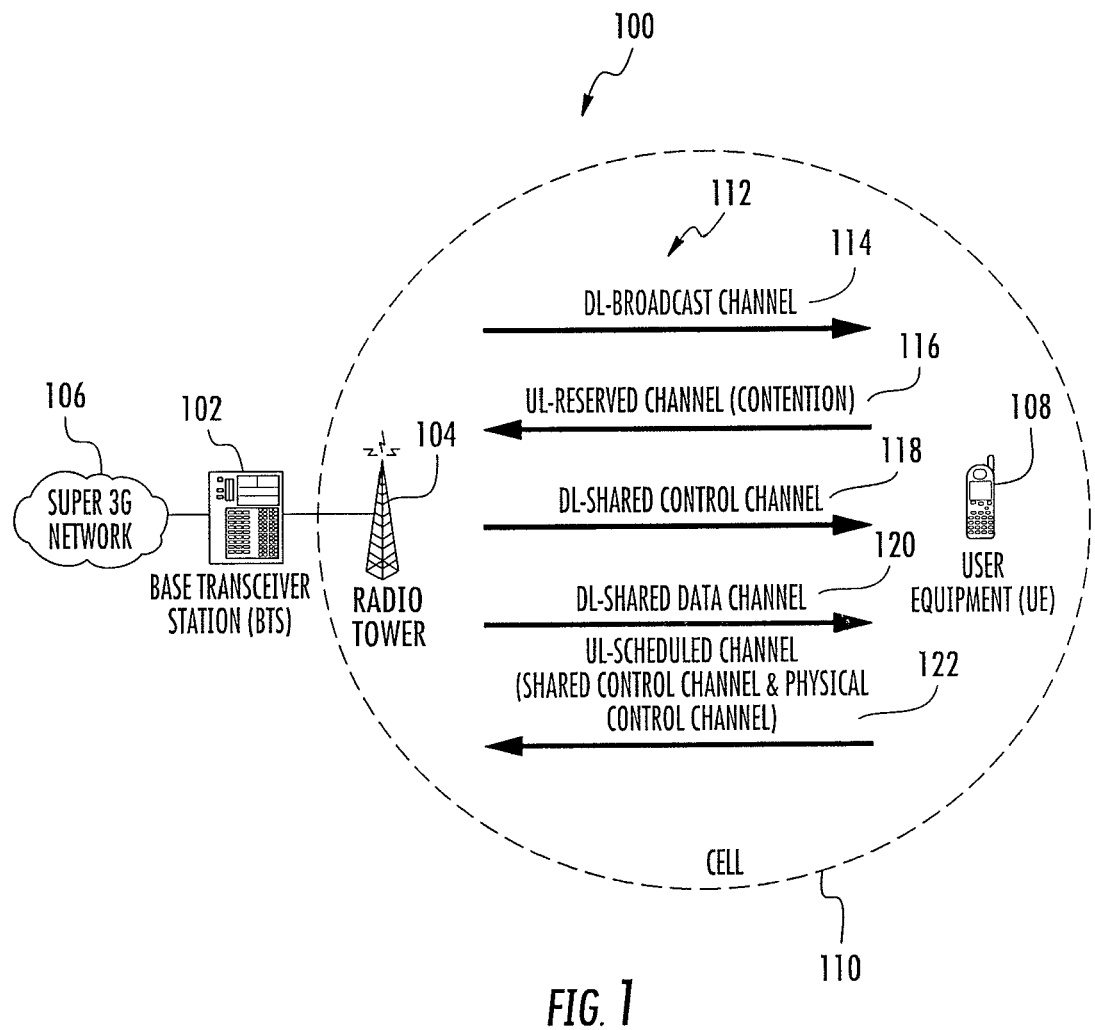
FIG. 1 is a schematic diagram illustrating a spread spectrum communication system in which an HSDPA service is provided from a base transceiver station to a user equipment.

Referring now to FIG. 1, there is shown generally a spread spectrum communication network 100 including a base transceiver station (BTS) 102 operably connected to a radio transmission tower 104, and a user equipment (UE) 108.

For instance, the user equipment 108 is comprised of a mobile phone.

The base transceiver station (BTS) 102 and the radio tower 104 are operably connected to a communication network (Super 3G network) 106 conforming to the Super 3G system being developed by the 3GPP.

The base transceiver station 102 communicates with the user equipment 108 whilst the user equipment 108 is located within a broadcast cell 110. Control information and data is exchanged between the base transceiver station 102 and the user equipment 108 during the provision of High Speed Downlink Packet Access (HSDPA) services by means of a channel structure 112 including a downlink (DL) broadcast channel 114, an uplink (UL) reserved channel (contention) 116, a downlink (DL) shared control channel 118, a downlink (DL) shared data channel 120, and an uplink scheduled channel (shared control channel and physical control channel) 122.

For instance, the base transceiver station 102 includes a central processing unit (CPU), a first memory, a second memory, an input interface through which a command and/or data is input into the central processing unit, an output interface through which a result of steps having been executed by the central processing unit is output, and a bus through which the central processing unit is electrically connected with the first memory, the second memory, the input interface, and the output interface.

Each of the first and second memories and is comprised of a semiconductor memory such as a read only memory (ROM), a random access memory (RAM) or an IC memory card, or a storage device such as a flexible disc, a hard disc or an optic magnetic disc.

For instance, the first memory comprises a read only memory (ROM), and the second memory comprises a random access memory (RAM).

The first memory stores therein a program for causing the central processing unit to carry out a method of controlling an operation of the base transceiver station 102 for providing a packetized data transmission service to the user equipment 108 in a spread spectrum communication network. The second memory stores therein various data and parameters, and presents a working area to the central processing unit. The central processing unit reads the program out of the first memory, and executes the program. Thus, the central processing unit operates in accordance with the program stored in the first memory.

Figure 2A:
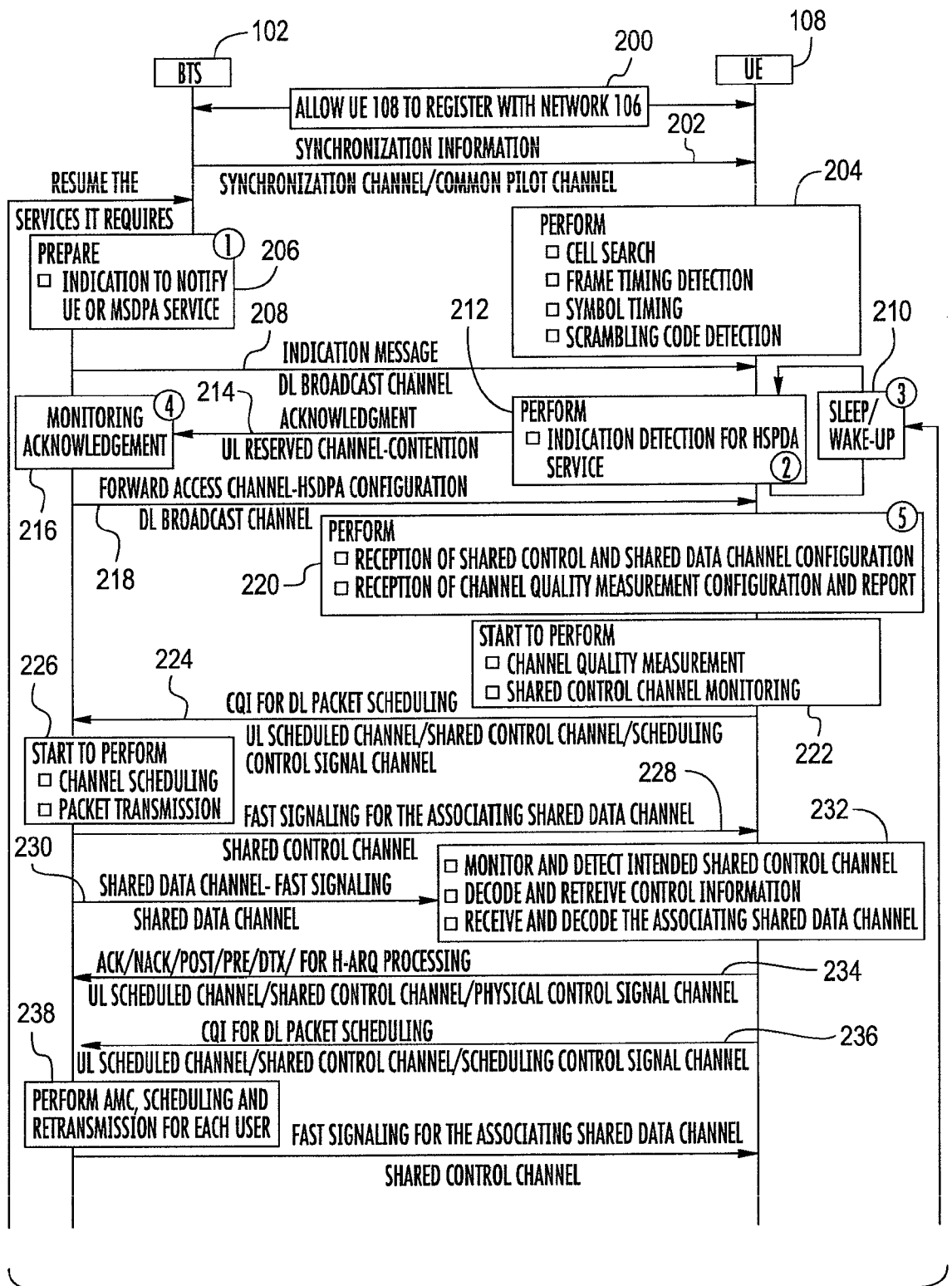
FIGS. 2A and 2B comprise a timing diagram illustrating the functional steps performed at both the base transceiver station and the user equipment during notification, acknowledgement, performance and termination of the HSDPA service.
Figure 2B:
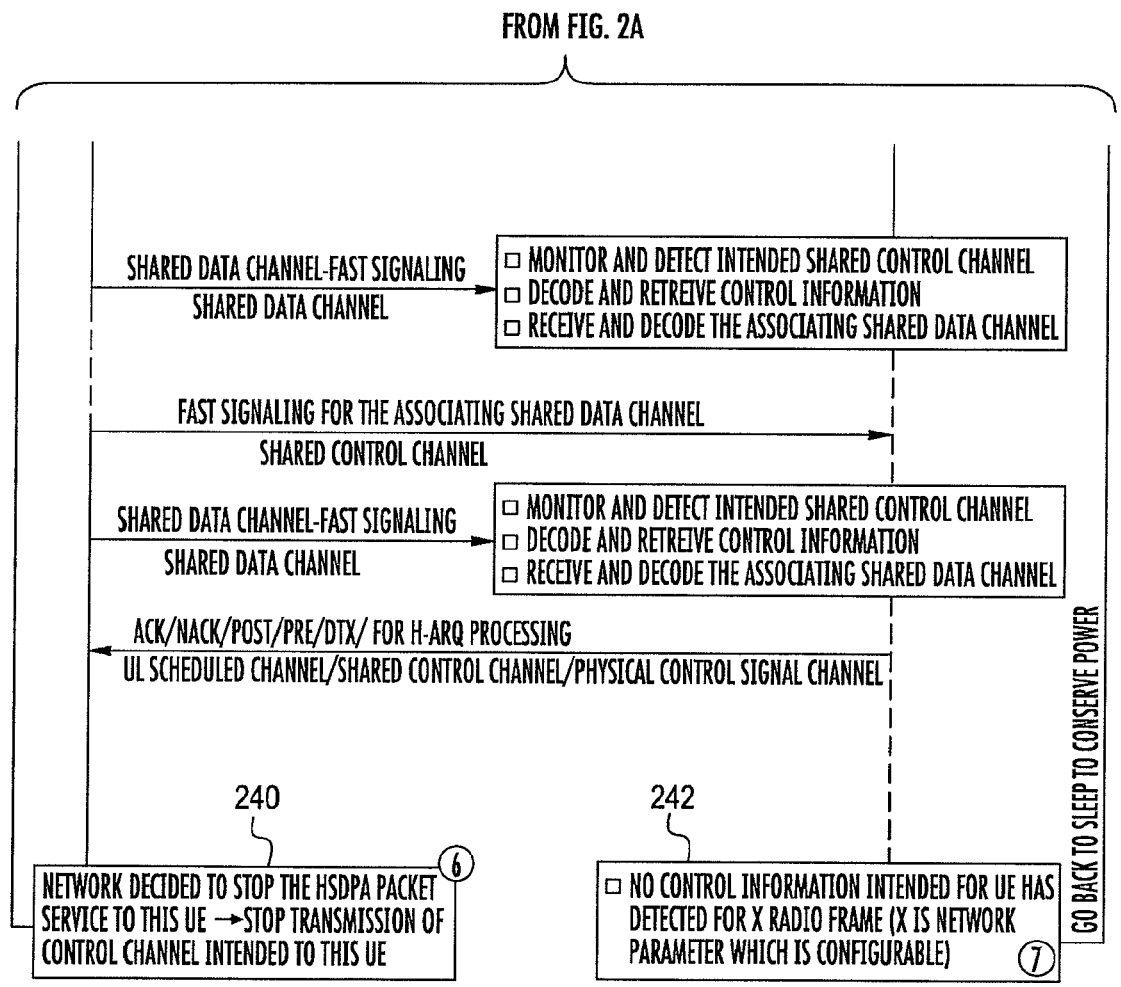

Referring now to FIGS. 2A and 2B, when the user equipment 108 moves within the broadcast cell 110, both the base transceiver station 102 and the user equipment 108 act at step 200 to allow the user equipment 108 to register with the Super 3G network 106 and thereby enable the base transceiver station 102 to communicate directly with the user equipment 108.

At step 202, the base transceiver station 102 transmits synchronization information to the user equipment 108 on a synchronization channel/common pilot channel in order for the user equipment 108 to detect relevant information sent to the user equipment 108 in data packets.

Upon receipt of the synchronization information at step 202, the user equipment 108 performs, at step 204, cell search, frame timing detection, symbol timing, and scrambling code detection functions in accordance with conventional WCDMA techniques to enable communication to be established between the Super 3G network 106 and the user equipment 108.

When an HSDPA service is to be provided to the user equipment 108, an indication message is prepared at step 206 to be broadcast to the entire cell 110, the indication message being encoded in such way that it can be decoded and identified by the user equipment 108 by a specific user equipment identification number that is allocated to the user equipment 108 by the Super 3G network 106 at step 200. The indication message acts to notify the user equipment 108 of an available HSDPA services intended for the user equipment 108.

The encoded information is then broadcast at step 208 on the downlink broadcast channel 114 (set of sub-carriers), the user equipment 108 being informed of the downlink broadcast channel 114 upon registration with the Super 3G network 106 at step 200.

At step 210, the user equipment 108 is normally in an inactive (sleep) state, except for predetermined periods of time when, in step 212, the user equipment 108 is placed in an active (wake-up) state in order to monitor the downlink broadcast channel 114 for indication messages transmitted from the base transceiver station 102.

If no indication message is detected, the user equipment 108 is once again placed in an inactive state.

However, if an indication message is detected, the user equipment 108 processes the indication message, and transmits an acknowledgement 214 of detection of the indication message to the base transceiver station 102 on the uplink reserved channel 116 using a contention approach. The uplink reserved channel information on which the acknowledgement 214 is transmitted is indicated to the user equipment 108 in the indication message.

The base transceiver station 102 monitors the uplink reserved channel 116 at step 216 for the acknowledgement 214.

Upon receipt of the acknowledgement 214 from the user equipment 108, the base transceiver station 102 informs the user equipment 108 about the contention completion, and starts to prepare and transmit the RAN HSDPA service configuration information 218 on the downlink broadcast channel 114, at a time and frequency allocated for this task. This downlink broadcast channel 114 is monitored only by the user equipment(s) 108 that previously sent an acknowledgement 214 to the indication message.

Upon successful completion of the contention, the user equipment 108 prepares to receive data on the downlink broadcast channel 114 at a predetermined time after completion of the contention, at step 220. The configuration information received on this channel assists the user equipment 108 to perform layer 1 (physical layer), layer 2 (medium access control/radio link control), and layer 3 (Radio Resource Control layer) configuration to monitor the downlink shared control channel 118, configuring the Hybrid Automatic Repeat Request (HARQ) related functions and performing channel quality measurement and reporting.

Once the configuration has taken place at step 220, the user equipment 108 starts performing, at step 222, channel quality measurement, and monitoring of the downlink shared control channel 118 to detect fast signaling intended for the user equipment 108 and other existing HSDPA related procedures for receiving data on the downlink shared data channel 120.

Accordingly, channel quality information (CQI) 224 is transmitted from the user equipment 108 to the base transceiver station 102 according to a preconfigured schedule in order to provide the base transceiver station 102 with information as to which frequency chunk in the downlink shared data channel 120 is best suited for the particular user equipment 108 in order that frequency scheduling can be optimized.

The channel quality information 224 is transmitted on the uplink scheduled channel 122. Once the base transceiver station 102 has received initial channel quality information 224, the base transceiver station 102, at step 226, performs channel scheduling and sends fast signaling information 228 on the downlink shared control channel 118 to the user equipment 108.

The associated packet data 230 is then sent on the downlink shared data channel 120 to the user equipment 108. At step 232, the user equipment 108 keeps monitoring the downlink shared control channel 118 on the allocated time-frequency slot.

Once the user equipment 108 detects control information intended for that user equipment 108, the user equipment 108 starts to receive and decode the associated packet data 230 transmitted on the downlink shared data channel 120.

The result of the data packet reception (ACK/NACK/POST/PRE/DTX for H-ARQ processing) 234 is then reported to the base transceiver station 102 on the associated uplink scheduled channel 122.

Similarly, the channel quality information (CQI) 236 for the downlink packet scheduling is again transmitted on the uplink scheduled channel 122.

At step 238, once the H-ARQ feedback information and channel quality information has been received, the base transceiver station 102 performs Adaptive Modulation and Coding (AMC), scheduling and retransmission for each user equipment 108. Retransmission occurs if a NACK message is received from the user equipment 108.

The above-mentioned steps 228 to 238 are then repeated at both the base transceiver station 102 and the user equipment 108 during provision of the HSDPA service to the user equipment 108.

Once the HSDPA service provided to the user equipment 108 is to be terminated, the base transceiver station 102 may simply stop transmission of control information on the downlink shared control channel 118 to the user equipment 108, at step 240.

In this case, upon failure of the user equipment 108 at step 242 to detect HSDPA control information within a predetermined time, the HSDPA service is terminated and the user equipment 108 is again placed in an inactive state.

Alternatively, the HSDPA service can be terminated by inclusion of the termination message in a packet header of an HSDPA control information packet sent to the user equipment 108 on the downlink shared data channel 120. Upon detection of the termination message at the user equipment 108, the HSDPA service may be terminated.

From the foregoing, it will be appreciated that the above-described method for providing an HSDPA service to a user equipment advantageously introduces a specific paging procedure and specific paging indication for an HSDPA service without requiring use of a dedicated data channel as currently described in WCDMA networks.

Moreover, the above-described method introduces a sleep mode to allow the Super 3G user equipment to save power when in use. A new channel is introduced to establish the Radio Resource Control (RRC) layer peer to peer communication for HSDPA RAN configuration, rather than relying upon a dedicated channel as in current WCDMA systems.

A packet transmission termination scheme is also introduced at the radio interface level to allow either the base transceiver station 102 to terminate a downlink packet transmission either temporarily or permanently whilst minimizing the exchange of traffic via the air interface between the base transceiver station 102 and the user equipment 108.

Finally, it is to be appreciated that various modifications and additions may be made to the above-described method of providing a high speed downlink packet access service to a user equipment in the spread spectrum communication network without departing from the spirit or ambit of the invention.

While the present invention has been described in connection with certain exemplary embodiments, it is to be understood that the subject matter encompassed by way of the present invention is not to be limited to those specific embodiments. On the contrary, it is intended by the subject matter of the invention to include all alternatives, modifications and equivalents as can be included with the spirit and scope of the following claims.

This application is based upon and claims the benefit of priority from Australian Patent Application No. 2005-904679 filed on Aug. 26, 2005, the entire disclosure of which, including specification, claims, drawings and summary, is incorporated herein by reference in its entirety.

The invention claimed is:

1. A method implemented in a spread spectrum communications system for providing a packetized data transmission service, the method comprising:
    broadcasting from a base station to a cell an indication of the packetized data transmission service on a downlink channel, the indication comprising a notification of the packetized data transmission service;
    monitoring, at a user equipment, the downlink channel for the indication of the packetized data transmission service from the base station,
    transmitting from the user equipment to the base station an acknowledgement of detection of the indication;
    transmitting packetized data transmission service configuration information from the base station to the user equipment on the downlink channel;
    transmitting from the base station to the user equipment control information for the packetized data transmission service on a downlink shared control channel;
    monitoring, at the user equipment, the downlink shared control channel for the control information for the packetized data transmission service;
    transmitting data for the packetized data transmission service from the base station to the user equipment on a downlink shared data channel;
    reporting from the user equipment to the base station channel quality information; and
    transmitting from the base station to the user equipment an indication of termination of the packetized data transmission service on a downlink shared control channel,
    wherein the user equipment has two states that comprise an active state to monitor the downlink channel and an inactive state, and
    wherein the user equipment utilizes the packetized data transmission service configuration information to monitor the downlink shared control channel for the control information for the packetized data transmission service.

2. A base station for providing a packetized data transmission service in a spread spectrum communications system, the base station comprising:
    a transceiver to broadcast to a cell an indication of the packetized data transmission service on a downlink channel, the indication comprising a notification of the packetized data transmission service, to transmit packetized data transmission service configuration information to a user equipment on the downlink channel; and to receive from the user equipment an acknowledgement of detection of the indication,
    wherein the user equipment monitors the downlink channel for the indication from the base station,
    wherein the base station transmits control information for the packetized data transmission service to the user equipment on a downlink shared control channel,
    wherein the base station transmits data for the packetized data transmission service to the user equipment on a downlink shared data channel,
    wherein the user equipment monitors the downlink shared control channel for the control information for the packetized data transmission service,
    wherein the user equipment utilizes the packetized data transmission service configuration information to monitor the downlink shared control channel for the control information for the packetized data transmission service,
    wherein the user equipment reports to the base station channel quality information,
    wherein the base station transmits to the user equipment an indication of termination of the packetized data transmission service on a downlink shared control channel, and
    wherein the user equipment has two states that comprise an active state to monitor the downlink channel and an inactive state.

3. A user equipment for receiving a packetized data transmission service in a spread spectrum communications system, comprising:
    a transceiver to monitor a downlink channel for an indication of the packetized data transmission service from a base station, the indication comprising a notification of the packetized data transmission service receive from the base station packetized data transmission service configuration information on the downlink channel, and transmit to the base station an acknowledgement of detection of the indication;
    wherein the base station broadcasts to a cell the indication of the packetized data transmission service on the downlink channel,
    wherein the user equipment monitors a downlink shared control channel for the control information for the packetized data transmission service,
    wherein the user equipment receives control information for the packetized data transmission service from the base station on the downlink shared control channel, and
    wherein the user equipment receives data for the packetized data transmission service from the base station on a downlink shared data channel, wherein the user equipment utilizes the packetized data transmission service configuration information to monitor the downlink shared control channel for the control information for the packetized data transmission service, wherein the user equipment reports to the base station channel quality information, wherein the user equipment receives from the base station an indication of termination of the packetized data transmission service on a downlink shared control channel, and wherein the user equipment has two states that comprise an active state to monitor the downlink channel and an inactive state.

4. A base station for providing a packetized data transmission service in a spread spectrum communications system, the base station comprising:

transceiving means for broadcasting to a cell an indication of the packetized data transmission service on a downlink channel, the indication comprising a notification of the packetized data transmission service, transmitting packetized data transmission service configuration information to a user equipment on the downlink channel, and receiving from the user equipment an acknowledgement of detection of the indication, wherein the user equipment monitors the downlink channel for the indication from the base station, wherein the base station transmits control information for the packetized data transmission service to the user equipment on a downlink shared control channel, wherein the base station transmits data for the packetized data transmission service to the user equipment on a downlink shared data channel, wherein the user equipment monitors the downlink shared control channel for the control information for the packetized data transmission service, wherein the user equipment utilizes the packetized data transmission service configuration information to monitor the downlink shared control channel for the control information for the packetized data transmission service, wherein the user equipment reports to the base station channel quality information, wherein the base station transmits to the user equipment an indication of termination of the packetized data transmission service on a downlink shared control channel, and wherein the user equipment has two states that comprise an active state to monitor the downlink channel and an inactive state.

5. A user equipment for receiving a packetized data transmission service in a spread spectrum communications system, comprising:

transceiving means for monitoring a downlink channel for an indication of the packetized data transmission service from a base station, the indication comprising a notification of the packetized data transmission service; receiving from the base station packetized data transmission service configuration information on the downlink channel; and transmitting to the base station an acknowledgement of detection of the indication, wherein the base station broadcasts to a cell the indication of the packetized data transmission service on the downlink channel, wherein the user equipment monitors a downlink shared control channel for the control information for the packetized data transmission service, wherein the user equipment receives control information for the packetized data transmission service from the base station on the downlink shared control channel, and wherein the user equipment receives data for the packetized data transmission service from the base station on a downlink shared data channel, wherein the user equipment utilizes the packetized data transmission service configuration information to monitor the downlink shared control channel for the control information for the packetized data transmission service, wherein the user equipment reports to the base station channel quality information, wherein the user equipment receives from the base station an indication of termination of the packetized data transmission service on a downlink shared control channel, and wherein the user equipment has two states that comprise an active state to monitor the downlink channel and an inactive state.

* * * * *